(12) United States Patent
Kuno (10) Patent No.: US 8,134,574 B2
(45) Date of Patent: Mar. 13, 2012

(54) CONVERSION TABLE CREATING DEVICE, STORAGE MEDIUM STORING CONVERSION TABLE CREATING PROGRAM, AND CONVERSION TABLE CREATING METHOD

(75) Inventor: Masashi Kuno, Obu (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 823 days.

(21) Appl. No.: 12/176,772

(22) Filed: Jul. 21, 2008

(65) Prior Publication Data

US 2009/0027746 A1    Jan. 29, 2009

(30) Foreign Application Priority Data

Jul. 23, 2007    (JP) ................... 2007-190931

(51) Int. Cl.
*G03F 3/08* (2006.01)
(52) U.S. Cl. ........ 345/604; 345/589; 345/590; 345/591; 345/606; 345/607; 345/608; 345/609; 345/610; 358/523
(58) Field of Classification Search ............ 345/589, 345/590, 591, 604, 606–610; 358/523
See application file for complete search history.

(56) References Cited

U.S. PATENT DOCUMENTS

| | | | | |
|---|---|---|---|---|
| 5,264,927 A | * | 11/1993 | Miyoshi et al. | 358/527 |
| 5,390,035 A | * | 2/1995 | Kasson et al. | 358/518 |
| 5,867,634 A | * | 2/1999 | Hirota et al. | 358/1.2 |

(Continued)

FOREIGN PATENT DOCUMENTS

JP    H10-276337    10/1998

(Continued)

OTHER PUBLICATIONS

"Classification of Tolerant Color Difference", Color Handbook, 2nd Edition, Jun. 10, 1998, pp. 288, 290, 300 and 1538, together with English Abstract of pp. 288 and 290.

(Continued)

*Primary Examiner* — Xiao M. Wu
*Assistant Examiner* — Todd Buttram
(74) *Attorney, Agent, or Firm* — Scully, Scott, Murphy & Presser, PC (57) ABSTRACT

Each of a plurality of polyhedron spaces is defined by a plurality of first vertices. Each of the plurality of first vertices is defined by a plurality of sets of third color data that are defined in the second color space. A color data setting unit sets a plurality of sets of fourth color data that are defined in a first color space in one to one correspondence with the plurality of third color data sets. A second dividing unit divides each of a plurality of polyhedron spaces into a plurality of smaller polyhedron spaces by a division number set for the each polyhedron spaces. Each of the plurality of smaller polyhedron spaces is defined by a plurality of second vertices and the plurality of first vertices. Each of the plurality of second vertices is defined by a plurality of sets of fifth color data defined in the second color space. An interpolation calculation unit calculates a plurality of sets of sixth color data that are defined in the first color space in one to one correspondence with the plurality of second vertices by interpolating the plurality of the fourth color data sets. A conversion table creating unit creates a conversion table based on the fourth color data sets and the sixth color data sets and on the third color data sets and the fifth color data sets.

8 Claims, 7 Drawing Sheets

U.S. PATENT DOCUMENTS

| | | | |
|---|---|---|---|
| 5,930,388 A * | 7/1999 | Murakami et al. | 382/167 |
| 6,275,607 B1 | 8/2001 | Shimizu et al. | |
| 6,724,500 B1 * | 4/2004 | Hains et al. | 358/1.9 |
| 7,009,734 B2 * | 3/2006 | Suwa et al. | 358/1.9 |
| 7,068,859 B2 * | 6/2006 | Hiratsuka et al. | 382/300 |
| 7,595,919 B2 * | 9/2009 | Tsuji | 358/518 |
| 7,755,817 B2 * | 7/2010 | Ho et al. | 358/523 |
| 7,876,330 B2 * | 1/2011 | Hagiwara | 345/589 |
| 2007/0081719 A1 * | 4/2007 | Moriya | 382/162 |
| 2007/0286502 A1 * | 12/2007 | Uetani et al. | 382/238 |

FOREIGN PATENT DOCUMENTS

| | | |
|---|---|---|
| JP | H11-088709 | 3/1999 |
| JP | 2001-008043 | 1/2001 |
| JP | 2002-64719 | 2/2002 |
| JP | 2003-008912 | 1/2003 |
| JP | 2003-283856 | 10/2003 |
| JP | 2004-364144 | 12/2004 |

OTHER PUBLICATIONS

Official Action dated Jun. 21, 2011 received from the Japanese Patent Office from related Japanese Application No. 2007-190931, together with an English-language translation.

Decision of Rejection dated Aug. 30, 2011 received from the Japanese Patent Office from related Japanese Application No. 2007-190931, together with an English-language translation.

* cited by examiner

RGB SPACE

FIG.3A

RGB SPACE

CONVERSION TABLE CREATING DEVICE, STORAGE MEDIUM STORING CONVERSION TABLE CREATING PROGRAM, AND CONVERSION TABLE CREATING METHOD

CROSS REFERENCE TO RELATED APPLICATION

The present application claims priority from Japanese patent application No. 2007-190931 filed Jul. 23, 2007. The entire content of the priority application is incorporated herein by reference.

TECHNICAL FIELD

The present invention relates to a conversion table creating device, a storage medium storing a conversion table creating program, and a conversion table creating method for creating a color conversion table.

BACKGROUND

Methods of creating a color conversion table are known. The color conversion table is used to achieve color matching in a device such as a color printer, by converting one color data about a one color space that does not depends on the device characteristics, to another color data about another color space that depends on the device characteristics.

Japanese Patent Application Publication No. 2002-64719, for example, discloses a method of obtaining a set of RGB values (point Q) to be input to a printer. The method defines one space to be output from the printer as an output color space (Lab color space) and another space to be input to the printer as an input color space (RGB color space). Further, the method is used to obtain the RGB value set (point Q) for providing a set of Lab values (point P).

Specifically, the printer prints a color patch. The color patch includes 729 colors (=9×9×9) that are uniformly distributed in the RGB color space that is an input color space of the printer. The color of the color patch is measured. A color (nearest point R) in the 729 colors, that is closest to the point P, is searched in the Lab color space. Next, a cubic space is specified, one vertex of which is the nearest point R. Then, Lab value sets corresponding to all RGB value sets existing in the specified cubic space are obtained by interpolation. The nearest point R (a set of Lab values) of the point P is searched from the Lab value sets obtained by the interpolation. The RGB value set for the nearest point R (which is regarded as point Q) is stored in a color conversion table.

SUMMARY

The accuracy of converting colors in the color conversion table can be enhanced by setting a plurality of interpolation points through the interpolation as in the method disclosed in Japanese Patent Application Publication No. 2002-64719. The larger the number of interpolation points thus set, the higher the accuracy will be. However, the required calculation time will increase as the interpolation point increases in number. In view of this, how efficiently the interpolation points should be set is very important.

In the method disclosed in Japanese Patent Application Publication No. 2002-64719, the Lab value sets that corresponds to all RGB values in the cubic space whose vertex is the nearest point R specified in the RGB color space are obtained by the interpolation. Thus, the method can convert colors at high accuracy. However, the method cannot create the color conversion table efficiently since the interpolation is performed excessively.

In view of the foregoing, it is an object of the present invention to provide a conversion table creating device, a storage medium storing a conversion table creating program, and a conversion table creating method, which is capable of setting the interpolation points required for creating the color conversion table efficiently.

To achieve the above and other objects, one aspect of the invention provides a conversion table creating device for creating a color conversion table for converting first color data defined in a first color space to second color data defined in a second color space. The conversion table creating device includes a first dividing unit, a color data setting unit, a division number setting unit, a second dividing unit, an interpolation calculation unit, and a conversion table creating unit. The first dividing unit divides a second color space into a plurality of polyhedron spaces. Each of the plurality of polyhedron spaces is defined by a plurality of first vertices. Each of the plurality of first vertices is defined by a plurality of sets of third color data that are defined in the second color space. The color data setting unit sets a plurality of sets of fourth color data that are defined in a first color space in one to one correspondence with the plurality of third color data sets. The division number setting unit sets a division number for dividing each of the plurality of polyhedron spaces into the plurality of smaller polyhedron spaces. The division number setting unit sets the division number for one polyhedron space independently from other polyhedron spaces. The second dividing unit divides each of the plurality of polyhedron spaces into a plurality of smaller polyhedron spaces by the division number set for the each polyhedron space. Each of the plurality of smaller polyhedron spaces is defined by a plurality of second vertices and the plurality of first vertices. Each of the plurality of second vertices is defined by a plurality of sets of fifth color data defined in the second color space. The interpolation calculation unit calculates a plurality of sets of sixth color data that are defined in the first color space in one to one correspondence with the plurality of second vertices by interpolating the plurality of the fourth color data sets. The conversion table creating unit creates a conversion table based on the fourth color data sets and the sixth color data sets and on the third color data sets and the fifth color data sets.

In another aspect of the present invention, there is provided a computer readable storage medium storing a computer-executable conversion table creating program for a conversion table creating device. The conversion table creating device creates a color conversion table for converting first color data defined in a first color space to second color data defined in a second color space. The conversion table creating program includes:

instructions for dividing a second color space into a plurality of polyhedron spaces, each being defined by a plurality of first vertices, each of the plurality of first vertices being defined by a plurality of sets of third color data that are defined in the second color space;

instructions for setting a plurality of sets of fourth color data that are defined in a first color space in one to one correspondence with the plurality of third color data sets;

instructions for setting a division number for dividing each of the plurality of polyhedron spaces into the plurality of smaller polyhedron spaces, and for setting the division number for one polyhedron space independently from other polyhedron spaces;

instructions for dividing each of the plurality of polyhedron spaces into a plurality of smaller polyhedron spaces by the division number set for the each polyhedron space, each being defined by a plurality of second vertices and the plurality of first vertices, each of the plurality of second vertices being defined by a plurality of sets of fifth color data defined in the second color space;

instructions for calculating a plurality of sets of sixth color data that are defined in the first color space in one to one correspondence with the plurality of second vertices by interpolating the plurality of the fourth color data sets; and instructions for creating a conversion table based on the fourth color data sets and the sixth color data sets and on the third color data sets and the fifth color data sets.

In another aspect of the present invention, there is provided a conversion table creating method for a conversion table creating device for creating a color conversion table for converting first color data defined in a first color space to second color data defined in a second color space. The conversion method creating method includes:

dividing a second color space into a plurality of polyhedron spaces, each being defined by a plurality of first vertices, each of the plurality of first vertices being defined by a plurality of sets of third color data that are defined in the second color space;

setting a plurality of sets of fourth color data that are defined in a first color space in one to one correspondence with the plurality of third color data sets;

setting a division number for dividing each of the plurality of polyhedron spaces into the plurality of smaller polyhedron spaces, and setting the division number for one polyhedron space independently from other polyhedron spaces;

dividing each of the plurality of polyhedron spaces into a plurality of smaller polyhedron spaces by the division number set for the each polyhedron space, each being defined by a plurality of second vertices and the plurality of first vertices, each of the plurality of second vertices being defined by a plurality of sets of fifth color data defined in the second color space;

calculating a plurality of sets of sixth color data that are defined in the first color space in one to one correspondence with the plurality of second vertices by interpolating the plurality of the fourth color data sets; and creating a conversion table based on the fourth color data sets and the sixth color data sets and on the third color data sets and the fifth color data sets.

DETAILED DESCRIPTION

Next, a conversion table creating device according to an embodiment of the present invention will be described with reference to the accompanying drawings.

1. Overall Configuration

Figure 1:
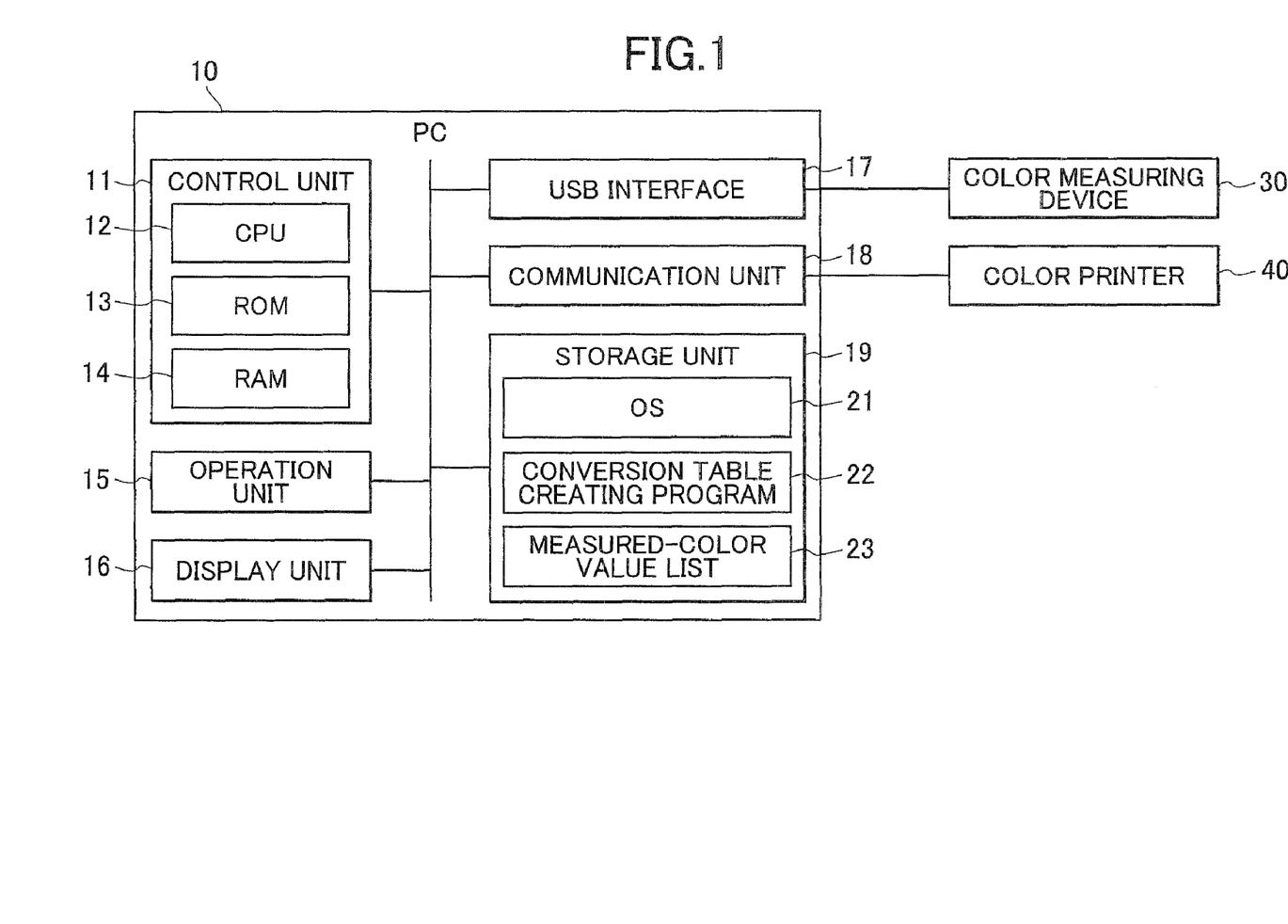
FIG. 1 is a block diagram showing a schematic configuration of a personal computer according to an embodiment of the present invention.

FIG. 1 is a block diagram showing a schematic configuration of a personal computer 10 as a conversion table creating device according to the embodiment of the present invention.

As shown in FIG. 1, the personal computer 10 includes a control unit 11, an operation unit 15, a display unit 16, a UBS interface 17, a communication unit 18 and a storage unit 19. The control unit 11 is composed of a microcomputer that includes a CPU 12, a ROM 13, and a RAM 14. The control unit 11 controls another components of the personal computer 10.

The operation unit 15 allows the user to input commands for controlling the personal computer 10. The operation unit 15 includes, for example, a keyboard and a pointing device (e.g., mouse).

The display unit 16 displays various data in the form of images the user can visually recognize. The display unit 16 is, for example, a liquid crystal display.

The UBS interface 17 transmits and receives data through a USB cable. Through the USB cable, the personal computer 10 according to this embodiment can communicate with a color measuring device 30. The color measuring device 30 measures a color of a color patch, represents the measured color as color data based on a color space (i.e., CIELAB color space, in this embodiment), irrespective of the device characteristics, and transmits the color data to the personal computer 10.

The communication unit 19 transmits and receives data via a network. The personal computer 10 according to this embodiment can communicate with a color printer 40 via the network (a local area network (LAN), in this embodiment). The color printer 40 receives color-image data based on RGB values from the personal computer 10. The color printer 40 is capable of printing an image according to the color-image data on a recording medium such as a paper sheet.

The storage unit 19 stores various data. The storage unit 19 is, for example, a hard disk drive. An operating system (OS) 21 and a conversion table creating program 22 are installed in the storage unit 19. The conversion table creating program 22 controls the control unit 11 to execute the table creating process for creating a color conversion table for the color printer 40. The storage unit 19 stores a measured-color value list 23, which will be described later.

2. Table Creating Process

The table creating process that the control unit 11 of the personal computer 10 executes in accordance with the conversion table creating program 22 will be described with reference to FIGS. 2 through 7.

In the table creating process, the personal computer 10 creates a color conversion table that is used to convert one color data based on the CIELAB color space irrespective of the device characteristics, to another color data based on the RGB color space that depends on the device characteristics.

Specifically, the personal computer 10 controls the color printer 40 to print color patches based on the RGB color space on a recording sheet. More specifically, the color printer 40 prints the color patches having 729 colors. The 729 colors are obtained by combining nine R values, nine G values, and nine B values. Each set of the nine R values, the nine G values, and the nine B values includes 0, 32, 64, 96, 128, 160, 192, 224, and 255, which are obtained by equally dividing the range of 0-255.

Next, the personal computer 10 controls the color measuring device 30 to measure color values (a set of Lab values) of each of the color patches. The color measuring device 30 obtains the Lab value sets corresponding to the RGB value sets for the 729 colors, respectively. That is, the color measuring device obtains a RGB-to-Lab relationship indicating the relationship between the RGB value sets and the Lab value sets. Then, the personal computer 10 determines a Lab-to-RGB relationship indication the relationship between the Lab value sets and the RGB value sets. A color conversion table is created based on the Lab-to-RGB relationship.

Specifically, the color conversion table for the Lab-to-RGB relationship is prepared. The color conversion table for the Lab-to-RGB relationship includes data corresponding to vertices (Lab lattice points) of cubic spaces defined by equally dividing the CIELAB color space, shown in FIG. 2A, along the three axes. For simplicity of explanation, in FIG. 2A, the CIELAB color space is represented as an a-b plane, or two-dimensional figure. An appropriate division number, by which entire ranges of the Lab values, is 17 to 33, in view of the calculation accuracy, the capacity for the color conversion table and the data amount for calculation.

The color conversion table for the Lab-to-RGB relationship stores: a set of RGB values, a color difference, and a flag in correspondence with each of the Lab lattice points (each set of Lab values). The RGB value set for each Lab lattice point is a set of RGB conversion values defined in the RGB color space into which the Lab value set of the subject Lab lattice point should be converted. The color difference for each Lab lattice point indicates a color difference in the CIELAB color space as a distance between a set of Lab values for the corresponding RGB value set and the Lab value set of the subject Lab lattice point. The flag for each Lab lattice point is a color gamut flag indicating whether the subject Lab lattice point is included in a color gamut of a device. In the Lab values of the CIELAB color space, L value ranges from 0 to 100 (that is, $0 \leq L \leq 100$), a value and b value are equal to or greater than $-128$ and equal to or smaller than 127 (that is, $-128 \leq a, b \leq 127$).

Next will be described the process for creating the color conversion table. First, the color conversion table for the RGB-to-Lab relationship is initialized. More precisely, the color gamut flags for all Lab lattice points are turned off (thus, indicating that all Lab lattice points are not included in the color region of the device). Further, the color difference for each of the Lab lattice points is set to the maximum value ($=\mathrm{sqrt}\,(100^2+256^2+256^2)$) that the color difference can have in the CIELAB color space.

Next, for each of the 729 measured Lab value sets, one Lab lattice point, whose Lab value set is the closest to the measured Lab value set is determined. A color difference between the Lab value set of the determined one Lab lattice point and the subject measured Lab value set, in the CIELAB color space, is calculated. The calculated color difference is compared with a color difference (whose initial value is the above-mentioned maximum value) that is registered at the determined one Lab lattice point at present. If the calculated color difference is smaller than the color difference that is registered at the determined one Lab lattice point, the calculated color difference is rewritten over the color difference registered at the determined one Lab lattice point, the RGB value set corresponding to the measured Lab value set is registered at the determined one Lab lattice point, and the color gamut flag is turned on. In other words, data of a measured Lab value set, whose distance from the Lab value set at the Lab lattice point is smaller than the already registered color difference is registered. Since the initial value of the color difference is set to the maximum value, the calculated color difference may be rewritten over the initial value of the color difference without comparing the calculated color difference with the color difference already registered at the Lab lattice point, if the color region flag is off. Note that the color region flag is used to determine the color region of a created color conversion table, though the flag does not directly pertain to the essence of the present invention.

Figure 2A:
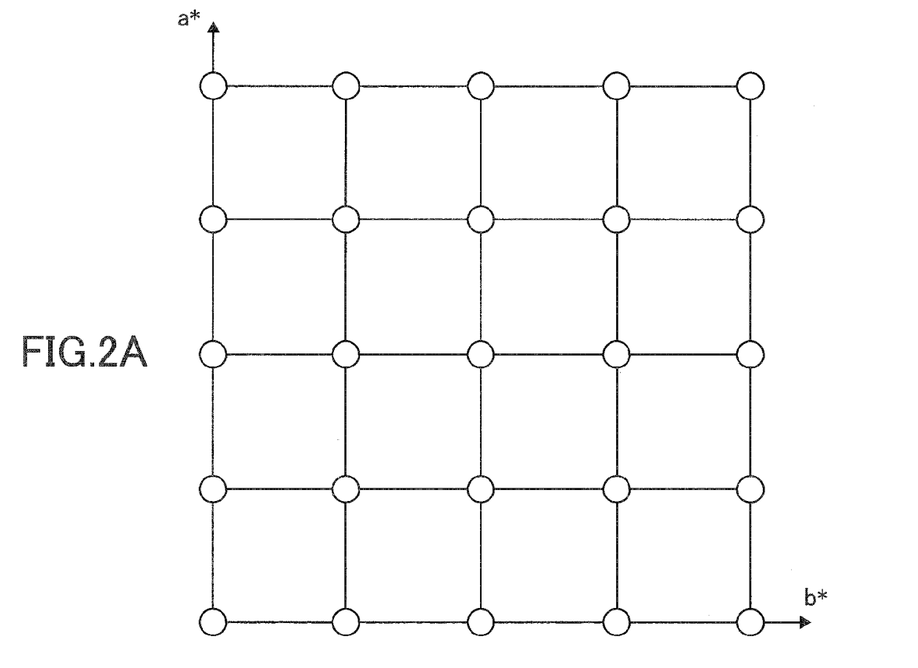
FIGS. 2A and 2B are explanatory diagrams for creating a Lab color conversion table according to the embodiment.
Figure 2B:
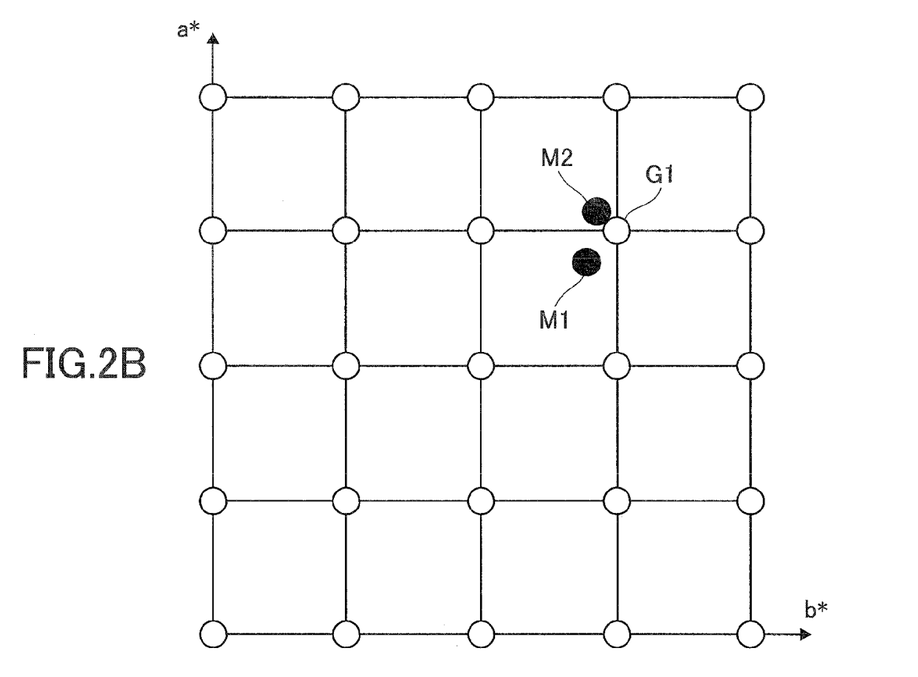

In the example shown in FIG. 2B, a lattice point G1 is determined as the closest to the measured Lab value set M1. If a color difference between the Lab value set at the lattice point G1 and the measured Lab value set M1 is smaller than a color difference registered at the lattice point G1 at present, the smaller color difference is rewritten over the presently-registered value, the RGB value set corresponding to the measured Lab value set is registered, and the color region flag is turned on. Thereafter, the measured Lab value set M2 that is closer to the lattice point G1 than the measured Lab value set M1 is processed in a similar way, whereby the color difference is updated to a smaller one.

The process described above is performed on the measured Lab value sets for all 729 colors. As a result, RGB value sets are registered in the color conversion table at all Lab lattice points that are included in the color gamut of the device. If the 729 colors are insufficient in number, there is a possibility that no set of RGB value is registered at some Lab lattice point. There is another possibility that a color difference of an insufficiently small amount is registered at some Lab lattice point at which a set of RGB values is registered. This will lead a large amount of error.

In view of this, an interpolation calculation is performed based on the measured Lab value sets for the 729 colors. The sets of RGB values that have been used to produce the 729 colors correspond to all RGB lattice points of cubic spaces that are defined by equally dividing the range of 0-255 on each RGB axis in nine steps in the RGB color space. Then, each of the cubic spaces is further divided into smaller polyhedron spaces (cubic spaces or rectangular parallelepiped spaces). The vertices of each polyhedron spaces other than the RGB lattice points of the original cubic spaces, are utilized as interpolation points. Then, a set of Lab values for each RGB interpolation point is calculated by interpolating the Lab value sets (i.e., measured color values) obtained at the RGB lattice points of the cubic space, through a three-dimensional, volumetric linear interpolation, for example. Then, similar to the measured Lab value sets for the 729 colors, one Lab lattice point in the color conversion table is determined with respect to the set of Lab values for each interpolation point. Since the RGB value sets are determined by dividing the range of 0 to 255 in nine steps in this embodiment, the inter-lattice difference is 32 for each axis in the range from 0 to 224, but cannot be 32 for each axis in the range from 224 to 255. In other wards, the inter-lattice differences cannot be the same for the entire range of RGB values. Hence, some "cubic spaces," are not cubic in the strict meaning of the word. For the sake of simplicity, however, the present description is based on the assumption that all cubic spaces are cubic.

Lab value sets are thus calculated for the RGB value sets at the interpolation points by means of interpolation. The RGB-to-Lab relationship can therefore be obtained at more points than the 729 colors of the color patch. As a result, the possibility of generating an Lab lattice point, at which no RGB value set is registered but which is included in the color gamut, is decreased, and a sufficiently small color difference will be registered at each Lab lattice point at which RGB values are registered.

The above effect is more prominent as more interpolation points are set by dividing each cubic space more minutely. However, the more interpolation points are set, the longer the calculation time will be. As described above, the interpolation points are determined by equally dividing the cubic spaces defined by equally dividing each RGB axis in nine steps in the RGB color space. Thus, the interpolation points are uniformly distributed in the RGB color space. However, the sets of Lab values, which the RGB value sets of the interpolation points correspond to, are not be uniformly distributed in the CIELAB color space. The Lab value sets are densely distributed in one region, and coarsely distributed in another region. In other words, the interpolation is effective in the one region, but not so effective in another region. After all, the interpolation is excessively performed in the one region where the interpolation is effective.

Figure 3A:
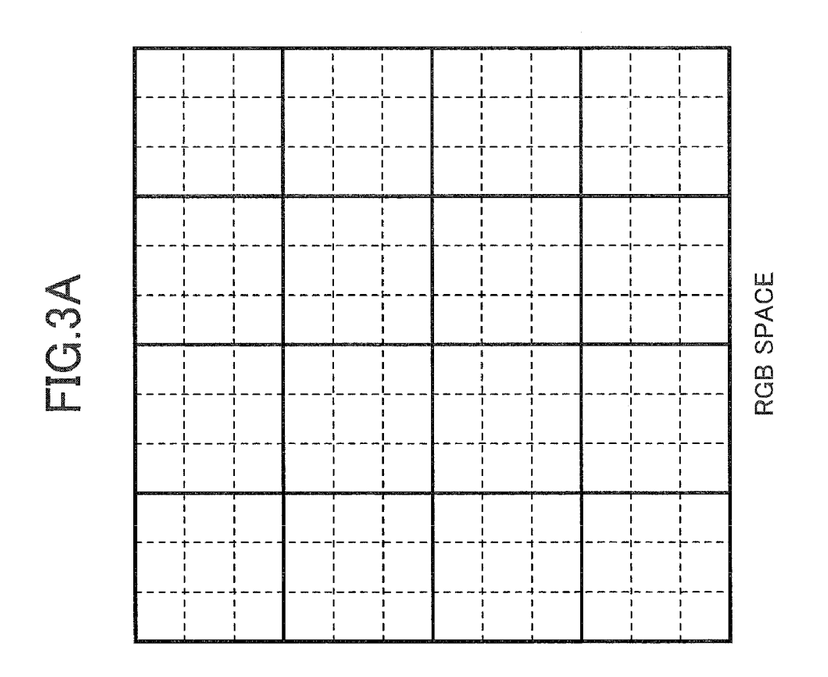
FIGS. 3A and 3B are diagrams explaining how to set a division number (interpolation points) in a cube space.
Figure 3B:
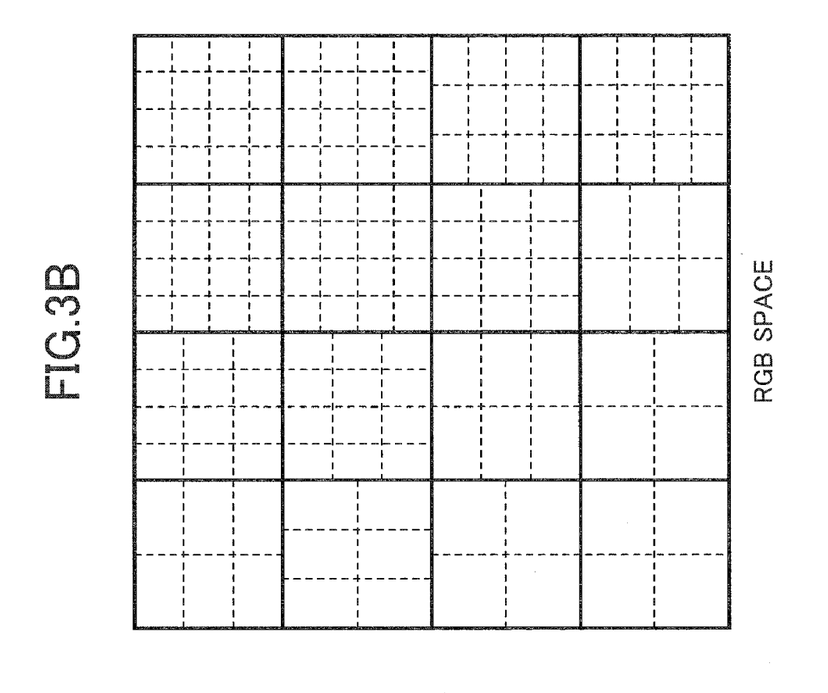

Therefore, in this embodiment, all cubic spaces are not divided by the same division number as shown in FIG. 3A. Instead, each cubic space is divided by a specific division number, independently of any other cubic space, as is shown in FIG. 3B. In FIGS. 3A and 3B, the RGB cubic spaces are schematically illustrated as two-dimensional figures, for the sake of simplicity, the solid lines indicating grid lines of edges of each cubic space, and the broken lines indicating grid lines or edges of each polyhedron.

To be more specific, the division number is set for each cubic space in accordance with Lab color differences between the measured Lab value sets that are obtained at the eight RGB lattice points that define each cubic space. The larger the color difference, the greater the division number. That is, a small division number is set to a cubic space that has a small color difference between the measured Lab value sets obtained at its RGB lattice points, whereas a great division number is set to a cubic space that has a large color difference between the measured Lab value sets obtained at its RGB lattice points. As a result, color differences between the Lab value sets obtained in correspondence with the RGB lattice points and the RGB interpolation points, will become uniform in the CIELAB color space. Thus, Lab points that correspond to the RGB lattice points and the RGB interpolation points will be uniformly distributed in the CIELAB color space. Interpolation points required for creating the color conversion table can be set at high efficiency.

Next will be described a method of setting, for each cubic space in the RGB color space, at least one division number D in based on at least one color difference between the measured Lab value sets that are obtained at least two of the eight RGB lattice points defining the cubic space.

In this embodiment, each division number D is set in consideration of the ability that naked eyes have in distinguishing one color from another. Specifically, the division number D is set by dividing a color difference ΔE by 1.2, and then rounding off the quotient to whole number. The color difference ΔE is determined based on at least one difference that are obtained at least two RGB lattice points among the eight RGB lattice points that surrounds the cubic space in the RGB color space. The value of 1.2 is a smallest color difference between two colors that most people can distinguish. (See Color Handbook, 2nd edition, published on Jun. 10, 1998, "Classification of Tolerant Color Difference," Table 7.6, p. 290, and ASTM (1953): Method E 97-53 T.) That is, most people can hardly distinguish between two colors when the color difference between the two colors is less than 1.2. Thus, using this value of 1.2 as a threshold, division number D is calculated based on the color difference ΔE according to the following equation:

$$D=\Delta E/1.2$$

In this embodiment, the division number D is obtained by dividing the color difference ΔE by 1.2, and then by rounding off the quotient to the whole number. Nonetheless, the method of setting the division number D is not limited to the above-described method. For example, the division number D may be obtained by changing the quotient to the nearest larger integral value.

The same division number may be set to R axis, G axis and B axis, or different division numbers may be set to R, G and B axes, respectively. Various methods of setting the division number D will be described.

(1) Setting the Same Division Number for R, G and B Axes

The cubic space is divided along the three axes, by the same division number in each axis. Hence, the resulting polyhedrons are cubes, too.

Figure 4:
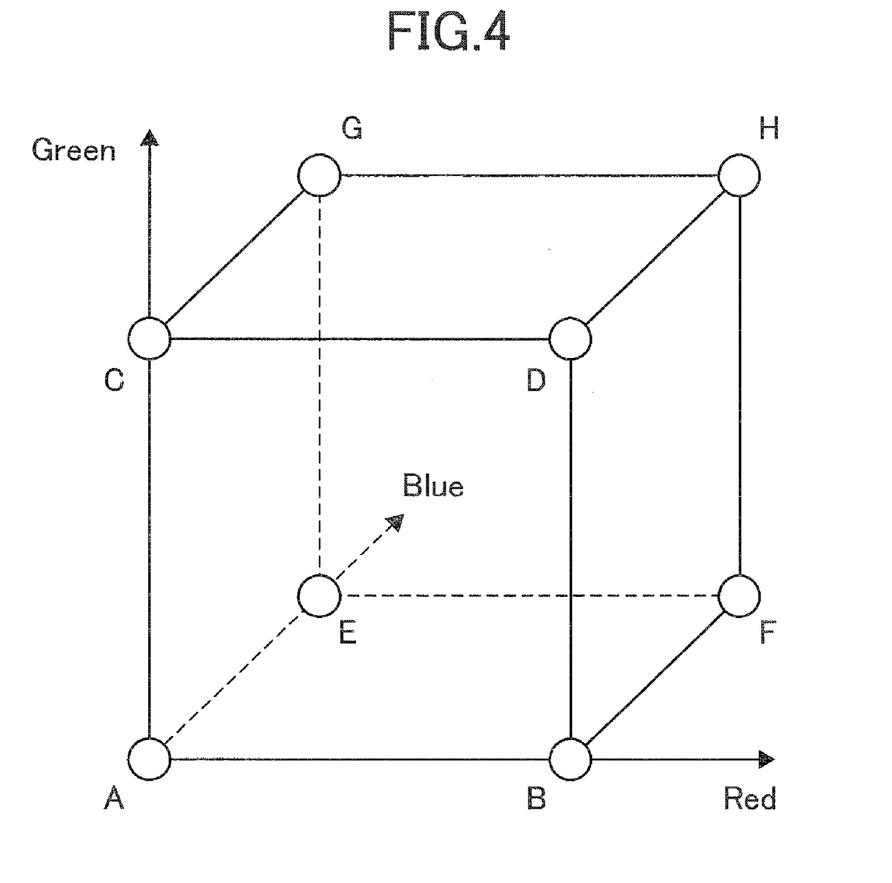
FIG. 4 is a perspective view illustrating an RGB cubic space.

Here, the division number may be set by either one of the following three methods (1A), (1B), and (1C), for example:

(1A) Setting Division Number D Based on Color Differences Along all Edges of the Cubic Space First, color differences between the measured Lab value sets at the RGB lattice points are calculated for twelve edges (AB, AC, AE, BF, BD, EF, EG, FH, CD, DH, HG and GC) of the cubic space, respectively, as shown in FIG. 4. An average of the twelve color differences is used as the color difference ΔE of the cubic space, and the division number D is calculated based on the average color difference, in accordance with the equation described above. Instead of the average of the color differences, a maximum value or a median value among the twelve color differences may be used as the color difference ΔE of the cubic space.

(1B) Setting Division Number D Based on Color Differences Along Diagonal Lines of Cubic Space Color differences between the measured Lab value sets at the RGB lattice points are calculated for the four diagonal lines (AH, BG, CF and DE) of the cubic space in FIG. 4, respectively. An average of the four color differences is used as the color difference ΔE of the cubic spacer and the division number D is calculated based on the average color difference, in accordance with the equation described above. Instead of the average of the color differences, a maximum value or a median value among the four color differences may be used as the color difference ΔE of the cubic space.

Alternatively, a color difference may be calculated for only one of the four diagonal lines and may be used as color difference ΔE for the cubic space. In this case, the diagonal AH that is parallel to the Gray axis should better be used as the single diagonal line.

(1C) Setting Division Number D Based on Color Differences Along Diagonal Lines on Faces of Cubic Space Color differences between the measured Lab value sets at the RGB lattice points are calculated for twelve diagonal lines (AD, BC, BH, DF, AG, CE, AF, EB, GF, EH, CH and GD) that are defined on six faces of the cubic space in FIG. 4, respectively. An average of the twelve color differences is used as the color difference ΔE of the cubic space, and the division number D is calculated based on the average color difference, in accordance with the equation described above. Instead of the average of the color differences, a maximum value or a median value among the twelve color differences may be used as the color difference ΔE of the cubic space.

(2) Setting Division Numbers for R, G and B Axes, Independently from One Another Three division numbers are determined to divide the R, G, and B axes of the cubic space, respectively. Hence, each of the divided small polyhedron spaces may be rectangular parallelepiped spaces or cubic spaces.

The division numbers for the three axes can be set as follows:

First, color differences between the measured Lab value sets at the RGB lattice points are calculated for four edges (AB, CD, EF and GH) that extend parallel to or along the R axis. Then, an average of the four color differences is used as the color difference ΔEr along the R axis. A division number Dr along the R axis is calculated based on the average color difference ΔEr in accordance with the equation described above. Instead of the average value, a maximum value or a median value among the four color differences may be used as the color difference ΔEr of the cubic space.

Similarly, color differences between the measured Lab value sets at the RGB lattice points are calculated for along four edges (AC, BD, EG and FH) that extend parallel to or along the G axis, and an average of the four color differences is used as the color difference ΔEg for the G axis. A division number Dg along the G axis is calculated based on the average color difference ΔEg in accordance with the equation described above. Instead of the average value, a maximum value or a median value among the four color differences may be used as the color difference ΔEg of the cubic space.

Similarly, color differences between the measured Lab value sets at the RGB lattice points are calculated for four edges (AE, BF, CG, and DH) that extend parallel to or along the B axis, and an average of four color differences is used as the color difference ΔEb along the B axis. A division number Db along the B axis is calculated based on the average color difference ΔEb in accordance with the equation described above. Instead of the average value, a maximum value or a median value among the four color differences may be used as the color difference ΔEb of the cubic space.

(3) Setting Division Numbers for the Twelve Edges of the Cubic Space, Independently from One Another Division number along each of the twelve edges of the cubic space is determined independently from division numbers along the other remaining edges. Hence, resultant, divided small polyhedron spaces may not be cubic spaces or rectangular parallelepiped spaces.

Figure 5A:
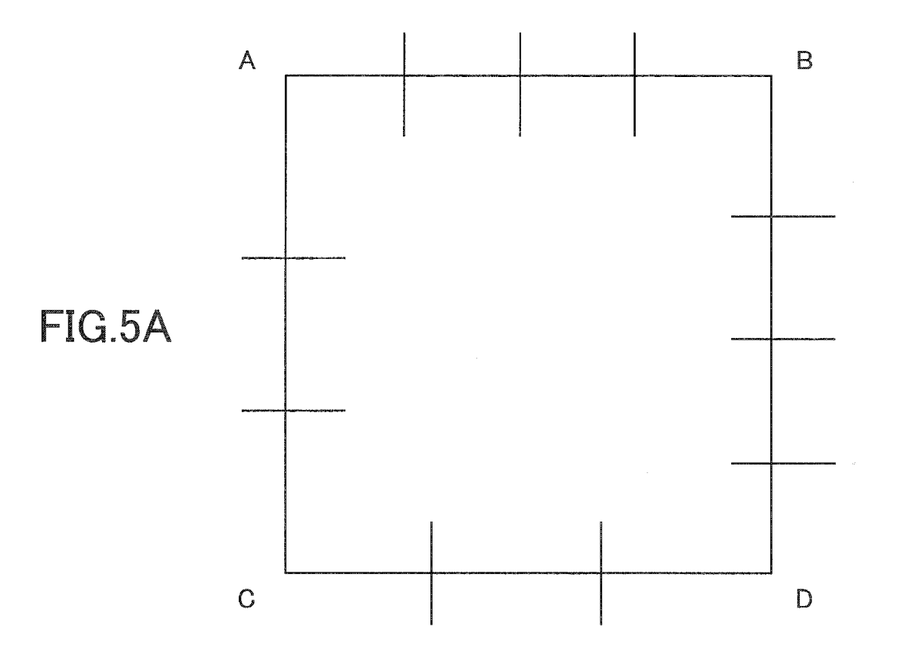
FIGS. 5A and 5B are diagrams explaining how to set division numbers (interpolation points) on the respective edges.
Figure 5B:
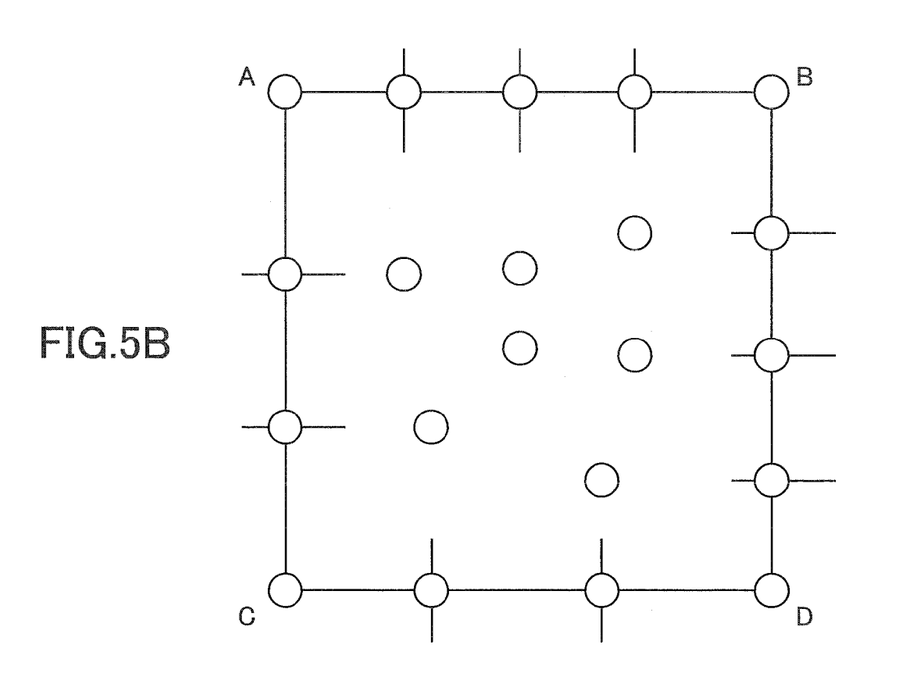

To facilitate the understanding, the cubic space is illustrated two-dimensional as a square as shown in FIGS. 5A and 5B. As shown in FIG. 5A, edges AB, AC, BD and CD are divided independently from one another, that is, by different division numbers in accordance with the color differences between the RGB lattice points along the respective edges. More precisely, edge AB is divided by 4, edge AC by 3, edge BD by 4, and edge CD by 3.

In this case, interpolation points are set as follows. Division number D for dividing an imaginary line that is parallel to edge AC and is away from edge AC a distance K is determined according to the following equation:

$$D = \text{round}((Dbd - Dac) \times K/Kab) + Dac$$

where Kab is the length of edge AB, Dac is the division number by which edge AC is divided, Dbd is the division number by which edge DB is divided, and round is rounding off the value to a whole number.

That is, the division number D is changed in accordance with the ratio of the distance K to the length Kab. Then, the interpolation points are set dependently on the division number D for the above-described imaginary line and on the division numbers for edges AB, AC, BD, and CD as shown in, for example, FIG. 5B.

3. Table Creating Process

The process for creating the color conversion table will be described in detail.

Figure 6:
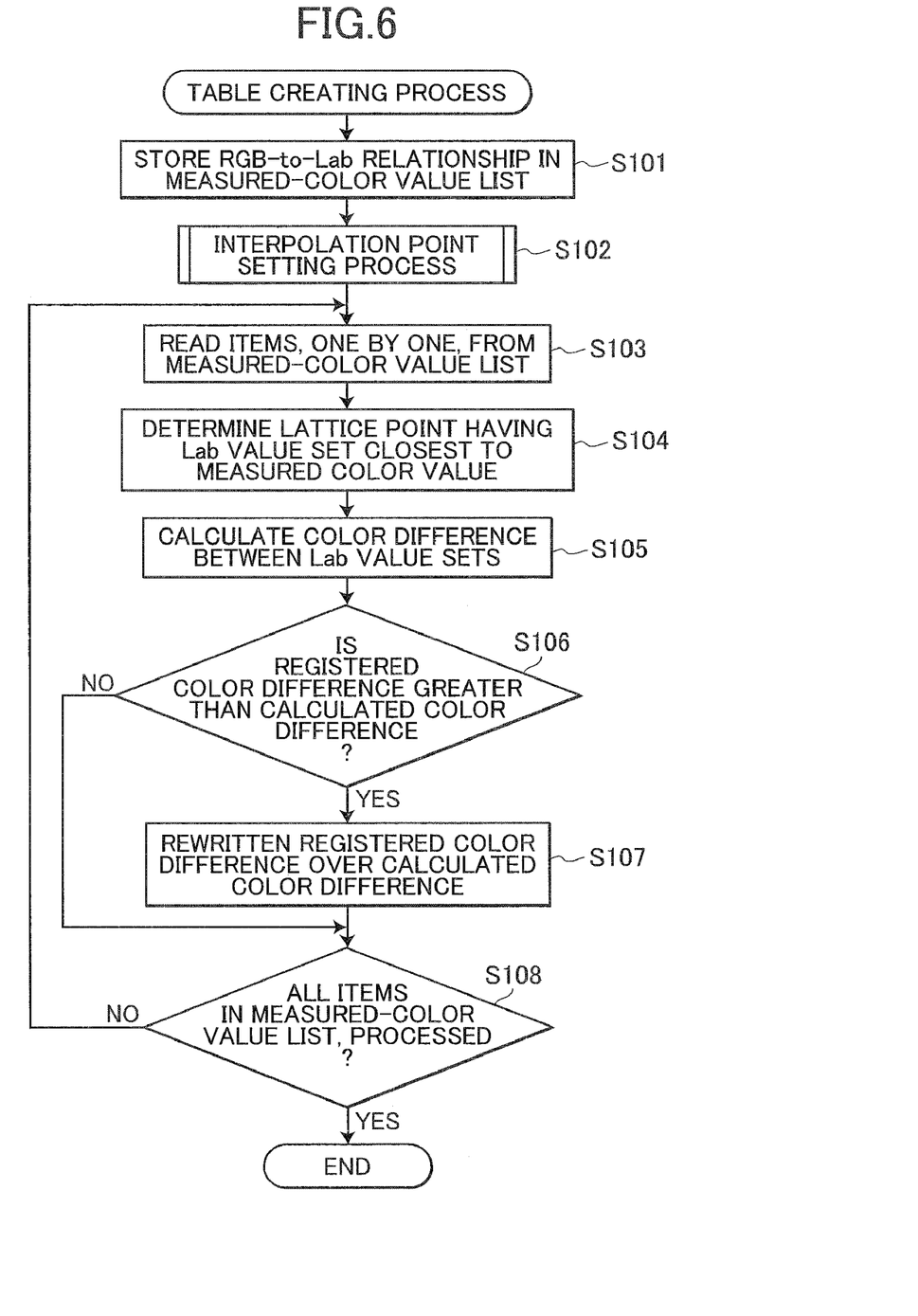
FIG. 6 is a flowchart illustrating steps in a table creating process.

FIG. 6 is a flowchart illustrating steps in the table creating process executed by the control unit 11 (more precisely, CPU 12) of the personal computer 10.

First, in S101 the control unit 11 registers the RGB-to-Lab relationship in the measured-color value list 23 of the storage unit 19. The RGB-to-Lab relationship is obtained by measuring the color patches having the 729 colors, in which the color printer 19 printed, by the color measuring device 30. The measured-color value list 23 indicates a relationship between the RGB value sets and the Lab value sets. As described above, the 729 colors are obtained by combining nine R values, nine G values, and nine B values, and the color measuring device 30 obtains the Lab value sets corresponding to the RGB value sets for the 729 colors, respectively.

Next, in S102 the control unit 11 executes an interpolation point setting process. The interpolation point setting process sets a plurality of interpolation points by dividing each cubic space in the RGB color space into small polyhedron spaces. Further, the interpolation point setting process adds sets of RGB values for the plurality of interpolation points and sets of Lab values for RGB interpolation points which are calculated by interpolating based on the Lab value sets obtained at the RGB lattice points of the cubic space. Therefore, the RGB-to-Lab relationship for the plurality of interpolation points is registered in the measured-color value list 23, in addition to the RGB-to-Lab relationship for the 729 Lab value sets. The interpolation point setting process will be described later in detail with reference to FIG. 7.

In S103, the control unit 11 reads one of a plurality of items registered in the measured-color value list 23. Each of the plurality of items corresponds to the RGB-to-Lab relationship between one RGB value sets and one Lab value sets. That is, the control unit 11 reads the RGB-to-Lab relationship between one RGB value sets and one Lab value sets. In this table creating process, as described later, the control unit 11 repeats series of processes in S103-S107 as many times as the number of the plurality of items, thus processing all the plurality of items registered in the measured-color value list 23. Therefore, in S103 the control unit 11 reads one of the plurality of items, which have not been read, in accordance with a prescribed rule (or in a prescribed order).

In S104, one Lab lattice point whose Lab value set is the closest to the one Lab value set read in S103, is determined from the Lab color conversion table.

Subsequently, in S105 the control unit 11 calculates a color difference between the one Lab value set read in S103 and the Lab value set of the determined one Lab lattice point in S104 in the CIELAB color space.

Next, in S106 the control unit 11 determines whether the color difference calculated in S105 is smaller than a color difference that is registered at the one Lab lattice point determined in S104. As mentioned above, the color conversion table for the Lab-to-RGB relationship stores: a set of RGB values, a color difference, and a color gamut flag in correspondence with each of the Lab lattice points (each set of Lab values). Further, the initial value of the color difference is set to the maximum value that the color difference can have in the CIELAB color space.

If the calculated color difference is smaller than the registered color difference (S106: YES), the control unit 11 advances to S107. In S107, the calculated color difference is rewritten over the registered color difference at the determined one Lab lattice point (or the color difference is updated). Then, the control unit 11 advances to S108.

If the calculated color difference is equal to or larger than the registered color difference (S106: NO), the control unit 11 advances directly to S108.

In S108 the control unit 11 determines whether the series of processes in S103-S107 have been executed on all the plurality of items registered in the measured color value list 23.

If the control unit 11 determines that the series of processes in S103-S107 have not been executed on all the plurality of items (S108: NO, that is, if any item remains unprocessed), the control unit 11 returns to S103 and repeats the series of processes in S103-S107 until all the plurality of items have been processed.

On the other hand, if the control unit 11 determines that the series of processes in S103-S107 have been executed on all the plurality of items (S108: YES), the control unit 11 ends the table creating process.

Next, the interpolation point setting process executed in S102 will be described with reference to the flowchart of FIG. 7. The following explanation is based on the assumption that the interpolation point setting process is performed by setting the division numbers for RGB axes independently in the manner (2) described above.

On starting the interpolation point setting process, in S201 the control unit 11 first selects one of the cubic spaces that are defined by equally dividing the range of 0-255 on each RGB axis in nine steps in the RGB color space. Then, the control unit 11 reads Lab value sets of eight RGB lattice points that defines the selected cubic space. In this interpolation point setting process, as described later, the control unit 11 repeats series of processes in S201-S206 as many time as the number of the cubic spaces. Ultimately, the series of processes in S201-S206 is executed on all the cubic spaces in the RGB color space. Therefore, in S201 the control unit 11 selects one of the cubic spaces not selected yet, in accordance with a prescribed rule (or in the prescribed order).

In S202, as stated above, the control unit 11 determines the average color difference ΔEr along the R axis in the selected cubic space in S201.

In S203, as stated above, the control unit 11 determines the average color difference ΔEg along the G axis in the selected cubic space in S201.

In S204, as stated above, the control unit 11 determines the average color difference ΔEb along the B axis in the selected cubic space in S201.

Then, in S205, the control unit 11 determines division numbers Dr, Dg and Db along the RGB axes, respectively, based on the average color differences ΔEr, ΔEg and ΔEb that have been determined in S202, S203 and S204.

Subsequently, in S206 the control unit 11 divides the selected cubic space in S201 along the three axes, by the division numbers Dr, Dg and Db determined in S205, thereby dividing the selected cubic space into smaller polyhedron spaces. Vertices of each polyhedron spaces other than the RGB lattice points of the original cubic spaces, are utilized as interpolation points. Then, the control unit 11 calculates a set of Lab values for each RGB interpolation point by interpolating the Lab value sets obtained at the RGB lattice points of the original cubic space. Further, the control unit 11 adds sets of RGB values and the sets of Lab values for the RGB interpolation points. Therefore, the RGB-to-Lab relationship for the RGB interpolation points is registered in the measured-color value list 23 of the storage unit 19, in addition to the RGB-to-Lab relationship for the RGB lattice points of the original cubic space.

Then, in S207 the control unit 11 determines whether series of processes in S201-S206 have been executed on all original cubic spaces in the RGB color spaces.

If the control unit 11 determines that the series of processes in S201-S206 have not been executed on all original spaces (S207: NO), the control unit 11 returns to S201 and repeats the serried of processes in S201-S206 until all the original cubic spaces have been processed.

On the other hand, if the control unit 11 determined that the series of processes in S201-S206 have been performed on all original cubic spaces (S207: YES), the control unit 11 ends the interpolation point setting process.

4. Advantages

As described above, the personal computer 10 according to this embodiment creates the color conversion table for converting one color data based on the CIELAB color space to another color data based on the RGB color space, in accordance with the Lab value sets for the CIELAB color space which are obtained at the vertices (the RGB lattice points) of each cubic space defined by dividing the RGB color space.

More specifically, each of the original cubic spaces in the RGB color space is further divided into a plurality of smaller polyhedron spaces. The vertices of each polyhedron spaces other than the RGB lattice points of the original cubic spaces, are utilized as interpolation points. Then, a set of Lab values for each RGB interpolation point is calculated by interpolating the Lab value sets obtained at the RGB lattice points of the cubic space. The color conversion table is created by using the Lab value sets for the RGB lattice points and the RGB interpolation points. A division number is set for every original cubic space for dividing into the smaller polyhedron spaces. Hence, the interpolation points required for creating the color conversion table can be set efficiently as compared with all original cubic spaces are divided by the same division number.

The division number is set for each cubic space in accordance with Lab color differences between the measured Lab value sets that are obtained at the eight RGB lattice points that define each cubic space. The larger the color difference, the greater the division number. As a result, color differences between the Lab value sets obtained in correspondence with the RGB lattice points and the RGB interpolation points, will become uniform in the CIELAB color space.

Moreover, different division numbers are set for the color-component axes of the RGB color space, independently from one anther. More precisely, the larger the color difference between the lattice points along one color-component axis, the greater the division number. Therefore, the interpolation points required for creating the color conversion table can be more efficiently as compared with one division number is set for every original cubic spaces with disregard to the color-component axes.

In addition, the division number that divides the original cubic space into the small polyhedron spaces has been obtained by dividing a color difference by 1.2, and then rounding off the quotient to whole number (or changing the quotient to the nearest larger integral value). Hence, the interpolation points used to create the color conversion table can be efficiently set in consideration of the ability that the naked eyes have in distinguishing one color from another.

5. Other Embodiments

While the invention has been described in detail with reference to specific embodiments thereof, it would be apparent to those skilled in the art that many modifications and variations may be made therein without departing from the spirit of the invention, the scope of which is defined by the attached claims.

Figure 7:
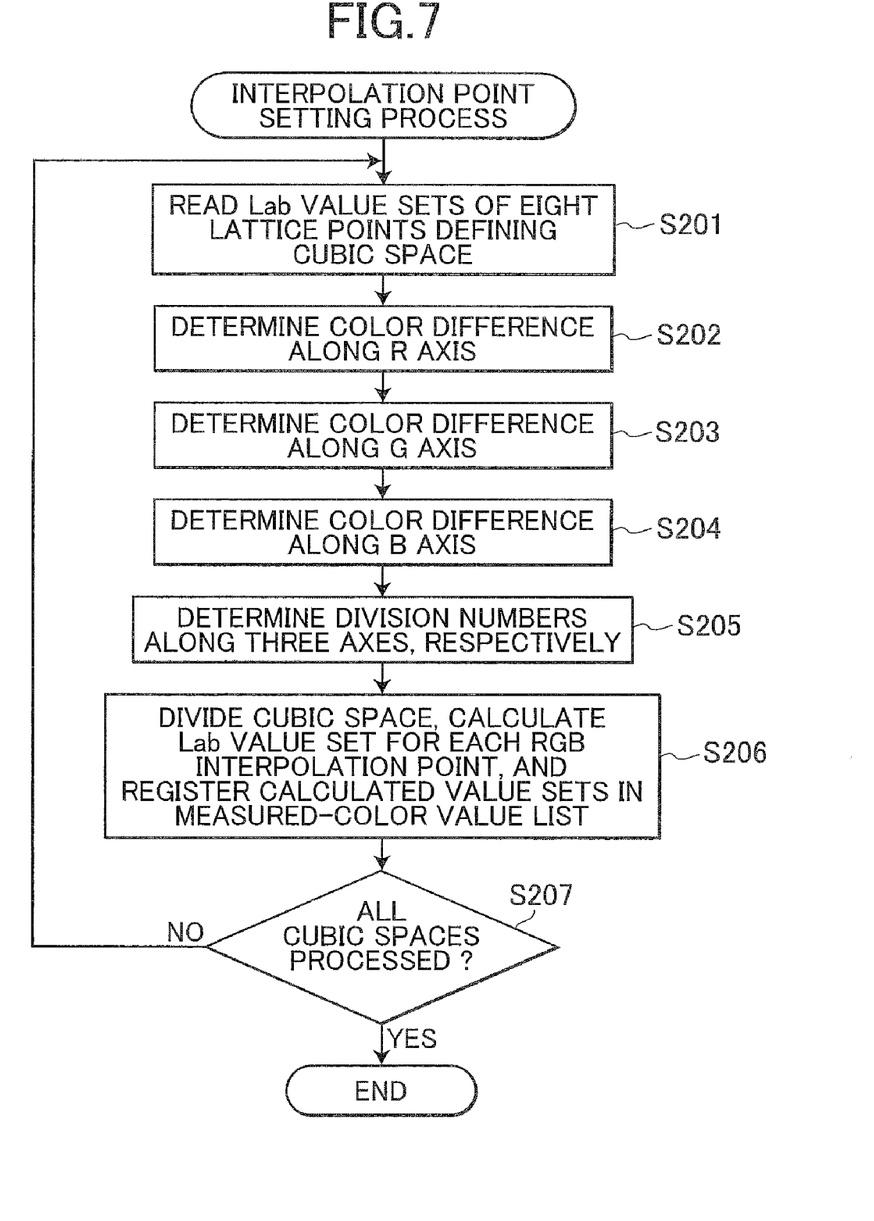
FIG. 7 is a flowchart illustrating steps in an interpolation point setting process.

In the above embodiment, the interpolation point setting process of FIG. 7 is performed by setting the division numbers for RGB axes independently in the manner (2) described above. However, the interpolation point setting process of FIG. 7 may be performed by setting division numbers for the twelve edges of the cubic space independently in the manner (3) described above. Thus, the interpolation points required for creating the color conversion table can be more efficiently In the above embodiment, the division number is calculated, using the value of 1.2 as the threshold. However, any value other than 1.2 may be used in accordance with the range of color difference in two colors that are perceived as the same color.

In the above embodiment, division numbers are set for the cubic spaces that are defined by equally dividing the RGB color space. However, division numbers may be set for spaces other than cubic spaces, such as trigonal pole spaces, trigonal pyramid spaces, and quadrangular pyramid spaces by dividing the RGB color space.

In the above embodiment, the device is the color printer 40, and the color space that depends on the device characteristics is the RGB color space. However, the color space is not limited to the RGB color space. For example, the color space may be CMY space, or YCC space. Further, the color space is not limited to a three-dimensional space. The color space may be four or more dimensions, such as CMYK space, in which case the same advantage is attained as in the three-dimensional color space.

In the above embodiment, the CIELAB color space is used as color space that does not depends on the device characteristics. However, the color space as such is not limited the CIELAB color space. The color space may be, for example, Lab space, CIEXYZ space, or CIECAM02 space.

In the above embodiment, each division number is independently calculated in accordance with the color differences between the RGB lattice points that define the cubic space in the RGB space. However, the method of setting the division numbers is not limited to this. Each division number may be independently calculated in accordance with any parameter other than the color difference.

What is claimed is:

1. A conversion table creating device for creating a color conversion table for converting first color data defined in a first color space to second color data defined in a second color space, comprising:
a processor configured to execute program instruction stored on a storage device, the program instructions providing:
a first dividing unit that divides a second color space into a plurality of polyhedron spaces, each being defined by a plurality of first vertices, each of the plurality of first vertices being defined by a plurality of sets of third color data that are defined in the second color space;
a color data setting unit that sets a plurality of sets of fourth color data that are defined in a first color space in one to one correspondence with the plurality of third color data sets;
a division number setting unit that sets a division number for dividing each of the plurality of polyhedron spaces into the plurality of smaller polyhedron spaces, the division number setting unit setting the division number for one polyhedron space independently from other polyhedron spaces;
a second dividing unit that divides each of the plurality of polyhedron spaces into a plurality of smaller polyhedron spaces by the division number set for the each polyhedron space, each being defined by a plurality of second vertices and the plurality of first vertices, each of the plurality of second vertices being defined by a plurality of sets of fifth color data defined in the second color space;
an interpolation calculation unit that calculates a plurality of sets of sixth color data that are defined in the first color space in one to one correspondence with the plurality of second vertices by interpolating the plurality of the fourth color data sets; and
a conversion table creating unit that creates a conversion table based on the fourth color data sets and the sixth color data sets and on the third color data sets and the fifth color data sets;
wherein the division number setting unit sets, for each polyhedron space, the division number based on a color difference between the plurality of the fourth color data sets that are set on the plurality of first vertices that define the each polyhedron space;
wherein the second color space is defined by a plurality of axes, and
wherein the division number setting unit sets the division numbers for the respective axes, independently from one another.

2. The conversion table creating device according to claim 1, wherein the division number setting unit sets the division number to cause the division number to increase as the color difference increases.

3. The conversion table creating device according to claim 1, the division number setting unit sets the division number by dividing the color difference by 1.2, and by rounding off a quotient to the whole number or changing the quotient to a nearest larger integral value.

4. A computer readable storage device storing a computer-executable conversion table creating program for a conversion table creating device, the conversion table creating device creating a color conversion table for converting first color data defined in a first color space to second color data defined in a second color space, the conversion table creating program comprising:
instructions for dividing a second color space into a plurality of polyhedron spaces, each being defined by a plurality of first vertices and a plurality of axes, each of the plurality of first vertices being defined by a plurality of sets of third color data that are defined in the second color space;
instructions for setting a plurality of sets of fourth color data that are defined in a first color space in one to one correspondence with the plurality of third color data sets;
instructions for setting a division number for dividing each of the plurality of polyhedron spaces into the plurality of smaller polyhedron spaces, and for setting the division number for one polyhedron space independently from other polyhedron spaces;
instructions for dividing each of the plurality of polyhedron spaces into a plurality of smaller polyhedron spaces by the division number set for the each polyhedron space, each being defined by a plurality of second vertices and the plurality of first vertices, each of the plurality of second vertices being defined by a plurality of sets of fifth color data defined in the second color space;

instructions for calculating a plurality of sets of sixth color data that are defined in the first color space in one to one correspondence with the plurality of second vertices by interpolating the plurality of the fourth color data sets; and instructions for creating a conversion table based on the fourth color data sets and the sixth color data sets and on the third color data sets and the fifth color data sets;

instructions, for each polyhedron space, setting the division number based on a color difference between the plurality of the fourth color data sets that are set on the plurality of first vertices that define the each polyhedron space; and instructions for setting the division numbers for the respective axes independently from one another.

5. A conversion table creating device for creating a color conversion table for converting first color data defined in a first color space to second color data defined in a second color space, comprising:

a processor configured to execute program instruction stored on a storage device, the program instructions providing:

a first dividing unit that divides a second color space into a plurality of polyhedron spaces, each being defined by a plurality of first vertices and by a plurality of edges, each of the plurality of first vertices being defined by a plurality of sets of third color data that are defined in the second color space;

a color data setting unit that sets a plurality of sets of fourth color data that are defined in a first color space in one to one correspondence with the plurality of third color data sets;

a division number setting unit that sets a division number for dividing each of the plurality of polyhedron spaces into the plurality of smaller polyhedron spaces, the division number setting unit setting the division number for one polyhedron space independently from other polyhedron spaces, the division number setting unit setting, for each polyhedron space, the division number based on a color difference between the plurality of the fourth color data sets that are set on the plurality of first vertices that define the each polyhedron space, the division number setting unit setting the division numbers for the respective edges, independently from one another;

a second dividing unit that divides each of the plurality of polyhedron spaces into a plurality of smaller polyhedron spaces by the division number set for the each polyhedron space, each being defined by a plurality of second vertices and the plurality of first vertices, each of the plurality of second vertices being defined by a plurality of sets of fifth color data defined in the second color space;

an interpolation calculation unit that calculates a plurality of sets of sixth color data that are defined in the first color space in one to one correspondence with the plurality of second vertices by interpolating the plurality of the fourth color data sets; and a conversion table creating unit that creates a conversion table based on the fourth color data sets and the sixth color data sets and on the third color data sets and the fifth color data sets.

6. The conversion table creating device according to claim 5, wherein the division number setting unit sets the division number to cause the division number to increase as the color difference increases.

7. The conversion table creating device according to claim 5, wherein the division number setting unit sets the division number by dividing the color difference by 1.2, and by rounding off a quotient to the whole number or changing the quotient to a nearest larger integral value.

8. A computer readable storage device storing a computer-executable conversion table creating program for a conversion table creating device, the conversion table creating device creating a color conversion table for converting first color data defined in a first color space to second color data defined in a second color space, the conversion table creating program comprising:

instructions for dividing a second color space into a plurality of polyhedron spaces, each being defined by a plurality of first vertices and a plurality of edges, each of the plurality of first vertices being defined by a plurality of sets of third color data that are defined in the second color space;

instructions for setting a plurality of sets of fourth color data that are defined in a first color space in one to one correspondence with the plurality of third color data sets;

instructions for setting a division number for dividing each of the plurality of polyhedron spaces into the plurality of smaller polyhedron spaces, for setting the division number for one polyhedron space independently from other polyhedron spaces, for each polyhedron space, setting the division number based on a color difference between the plurality of the fourth color data sets that are set on the plurality of first vertices that define the each polyhedron space, and for setting the division numbers for the respective edges independently from one another;

instructions for dividing each of the plurality of polyhedron spaces into a plurality of smaller polyhedron spaces by the division number set for the each polyhedron space, each being defined by a plurality of second vertices and the plurality of first vertices, each of the plurality of second vertices being defined by a plurality of sets of fifth color data defined in the second color space;

instructions for calculating a plurality of sets of sixth color data that are defined in the first color space in one to one correspondence with the plurality of second vertices by interpolating the plurality of the fourth color data sets; and instructions for creating a conversion table based on the fourth color data sets and the sixth color data sets and on the third color data sets and the fifth color data sets.

* * * * *